United States Patent [19]
Hurd et al.

[11] Patent Number: 5,402,581
[45] Date of Patent: Apr. 4, 1995

[54] ADJUSTABLE MITER BAR

[76] Inventors: Jonathan H. Hurd, 2932 Clarkson Rd., Cleveland Heights, Ohio 44118; James F. Vidmar, 4660 River St., Willoughby, Ohio 44094

[21] Appl. No.: 169,392

[22] Filed: Dec. 20, 1993

[51] Int. Cl.6 .................................... B26D 7/06
[52] U.S. Cl. ........................ 33/471; 83/437; 33/640
[58] Field of Search ............... 33/454, 455, 464, 465, 33/471, 534, 538, 640; 83/437, 468.2, 468.3, 522.13

[56] References Cited

U.S. PATENT DOCUMENTS

| | | | |
|---|---|---|---|
| 407,350 | 7/1889 | Hamilton | 33/454 |
| 503,726 | 8/1893 | Pryibil | 83/437 |
| 544,787 | 8/1895 | Heath | 33/454 |
| 562,298 | 6/1896 | Hewitt | 33/454 |
| 1,249,599 | 12/1917 | Danielsson | 33/454 |
| 2,502,124 | 3/1950 | Bray | 83/437 |
| 2,672,897 | 3/1954 | Cue | 83/437 |
| 2,759,503 | 8/1956 | Goldschmidt | 83/437 |
| 5,097,601 | 3/1992 | Pollak et al. | 33/469 |
| 5,207,007 | 5/1993 | Cucinotta et al. | 33/534 |
| 5,275,074 | 1/1994 | Taylor et al. | 83/437 |

FOREIGN PATENT DOCUMENTS 412655  6/1946  Italy ............... 33/454

Primary Examiner—Thomas B. Will

[57] ABSTRACT

Miter slot bar construction comprising a pair of elongated body members arranged in parallel interengaged position with resilient parts to cause the members to engage the sides of a miter slot uniformly for guiding action.

2 Claims, 1 Drawing Sheet

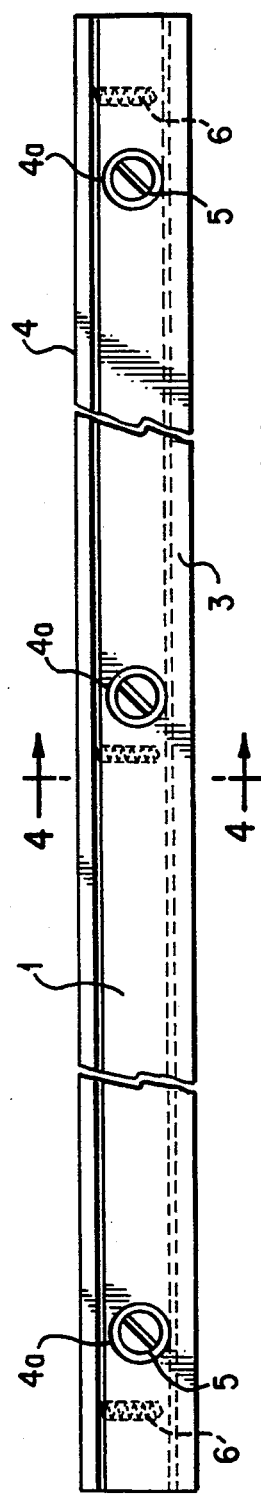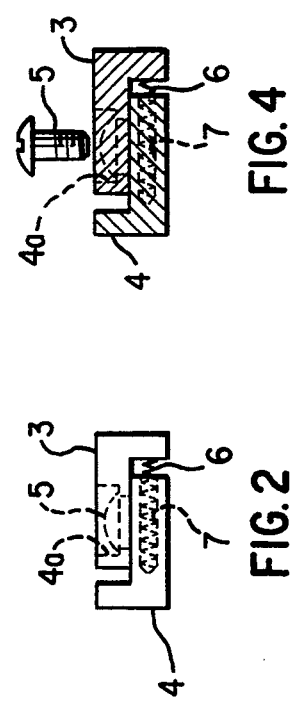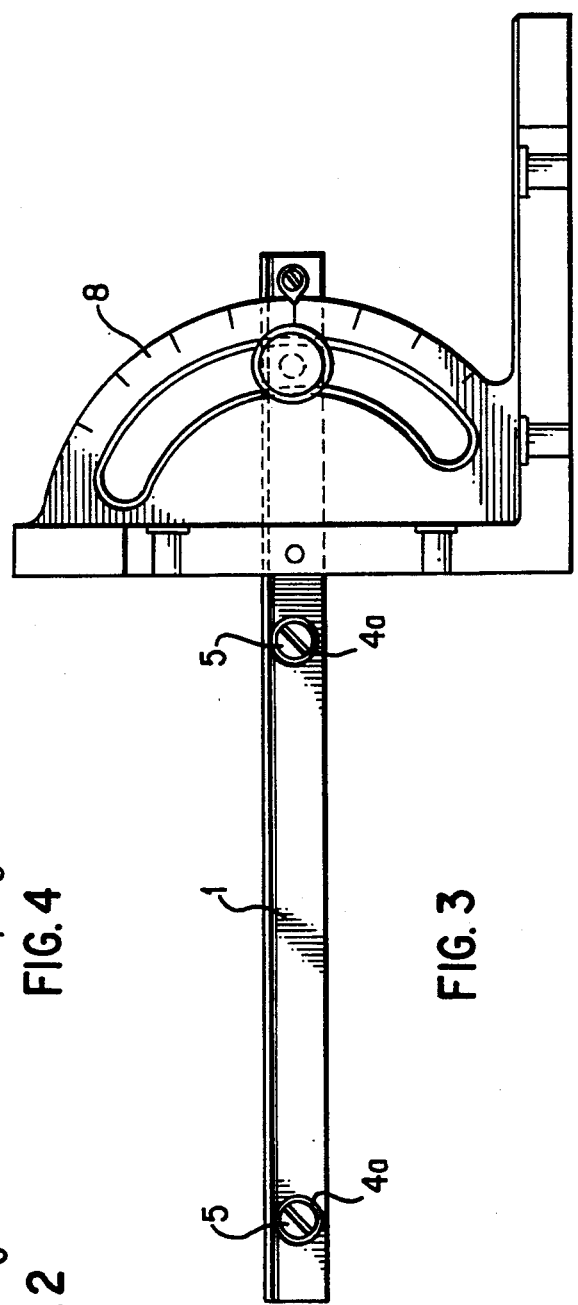

ADJUSTABLE MITER BAR

BACKGROUND OF THE DISCLOSURE

This invention relates to miter slot bars for saw tables or the like and is advantageous for use where the miter slot of one machine varies from such slot in another.

It is particularly helpful to use the device hereof where such slots vary slightly and require changes of the bar width, within relatively narrow limits as is the case with slots in machines of different manufacturers.

In fact machines which perform different kinds of operations manufactured by a particular manufacturer, may vary enough to make this device useful and in some instances where they make this invention of value where accuracy is important.

As an example of a particular instance in which this invention may be valuable is in conjunction with a circular table in which the miter slot is different from that of another machine and the miter guide is desirably switched from one to another. Adjustment is possible when uniform guiding action is provided through constant close spacing from one end of the slot to the other.

In the prior art with which we are familiar, the currently available bars which are intended to be used in different miter slots may have set screws which will make possible spaced contact, but it is not such contact as may extend throughout the slot length.

Another type of adjustment may be effected by causing expansion of the bar body by suitable slots and set screws which expand certain areas along the bar but do not provide continuing uniform contact.

We are not familiar with any patented constructions even though we are in fact very familiar with what is available in the market.

With the foregoing in mind, we note that our concept is to provide a miter slot bar of two piece construction which is spring loaded so as to expand in a slot and when so positioned the parts are fastened together to provide longitudinal close spacing with the sides of the slot over a substantial extent thereof.

Having described the general area of use of the particular device hereof, it is helpful to relate the same to a drawing and that is done herewith by providing in FIG. 1 thereof a top view of the assembled device with the same being shown in foreshortened form, since these devices are usually of some considerable length.

FIG. 2 is an end view of FIG. 1, showing the parts in assembled relationship.

FIG. 3 is a plan view of a right angle miter guide in association with a miter bar of the construction hereof.

FIG. 4 is a cross-sectional view taken about on the line 4—4 of FIG. 1 to illustrate the parts prior to their close association for fitting in a slot.

Turning now to a detailed description of the invention and using the drawings as a basis therefore, the miter bar hereof is designated generally at 1 and as will be seen from FIGS. 2 and 4 comprised of a pair of substantially identical L-shaped members 3 and 4 which are arranged in interleaved association, and normally held in that association by means of a machine screw 5.

As will be noted in FIG. 4 in enlarged detail, the parts 3 and 4 are separated normally at rest by means of springs 6 which are entered in sockets 7 at certain areas along the length of the bar in most cases three of these at least being provided in bars of substantial length.

These springs are intended to place expanding pressure so to speak on the respective members 3 and 4 so that when they are placed in a slot in a saw table or the like, the same will expand outwardly by reason of those springs and engage the sides of the slot with any predetermined tension. The machine screw 5 may then be tightened with the bars in engagement since the opening in which the machine screw is seated designated 4a is of substantially greater diameter than the machine screw head and shank. Thus some slop, so to speak, will be permitted to accommodate the variation in slot dimensions of various miter slots and provide for the adjustment desired to maintain the adjustment when accomplished.

As noted in FIG. 3, a suitable right angle miter guide such as 8 is often associated with a bar such as 1 which can be attached to the the right angle miter guide 8 in the conventional manner and the operation thereof is such that in use the guide will be able to slide back and forth in the table slot, with tension being placed upon the sides of the slot by permitting the springs to expand. To increase the amount of clearance, the respective parts 3 and 4 may be brought closer together by inserting a piece of paper or equivalent material in the slot along side one of them, so that when the material is removed that amount of clearance will be provided.

It is noted that the members 3 and 4 are of substantial length and as such provide for a guiding action throughout a substantial length of the saw table or other slot in which the bar is seated.

This is a desired arrangement since it prevent any undue clearance which would perhaps militate against accurate cut off where that itself is desired.

We claim:

1. A miter slot bar comprising a pair of substantially identical elongated body members shaped to complement each other when assembled lengthwise, said body members are substantially L-shaped in end elevation and present a substantial rectangular end elevation shape when arranged in interleaved association, means to resiliently press outwardly on said body members tending to separate same and uniformly engage same throughout the sides of a miter slot, and means to fasten said body members in adjusted positions in a miter slot.

2. A miter slot bar as claimed in claim 1, wherein said body members are fastened together with adjustable parts, to permit changes in the width of the assembled members, to seat in slots of varying widths.

* * * * *